United States Patent [19]

Wilson

[11] Patent Number: 4,528,342

[45] Date of Patent: Jul. 9, 1985

[54] EPOXY RESIN COMPOSITIONS

[75] Inventor: Douglas Wilson, Godalming, England

[73] Assignee: The British Petroleum Company p.l.c., London, England

[21] Appl. No.: 649,285

[22] Filed: Sep. 11, 1984

[30] Foreign Application Priority Data

Sep. 16, 1983 [GB] United Kingdom ............... 8324911

[51] Int. Cl.$^3$ ...................... C08G 63/00; C08G 69/00
[52] U.S. Cl. .................................. 525/463; 264/347; 264/331.12; 525/407; 523/435; 523/466; 523/468
[58] Field of Search ............... 525/407, 463; 264/331.12, 347

[56] References Cited

U.S. PATENT DOCUMENTS

| | | | |
|---|---|---|---|
| 3,098,056 | 7/1963 | Schnell et al. | 525/463 |
| 3,763,088 | 10/1973 | Izawa et al. | 525/463 X |
| 3,798,105 | 3/1974 | Hannah et al. | 156/307 |
| 4,066,630 | 1/1978 | Dixon et al. | 525/407 X |

FOREIGN PATENT DOCUMENTS 745682  4/1965  Canada .

Primary Examiner—Earl Nielsen
Attorney, Agent, or Firm—Morgan, Finnegan, Pine, Foley and Lee

[57] ABSTRACT

A hardenable epoxy resin comprising a curable epoxy resin, a hardener for the epoxy resin and a polymer of epihalohydrin which composition is characterized in that the amount of the polymer of epihalohydrin in the composition is from 1 to 6 parts per one hundred parts by weight of the epoxy resin and in that the composition also comprises from 2 to 25 parts by weight per hundred parts by weight of the epoxy resin, of a polycarbonate having the general formula:

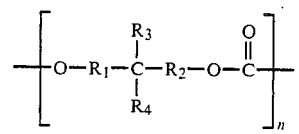

where $R_1$ and $R_2$ are the same or different and are phenyl or cyclohexyl groups, $R_3$ and $R_4$ are the same or different and are hydrogen, methyl or cyclohexyl groups and n is from 60 to 400 and represents the average number of monomer units in the polymer chain.

13 Claims, No Drawings

EPOXY RESIN COMPOSITIONS

This invention relates to a hardenable epoxy resin composition and in particular to a hardenable epoxy resin composition suitable for use as a matrix material in fiber reinforced articles.

Various materials have been suggested for use in epoxy resin compositions to improve the impact strength of the cured epoxy resin. Among the materials suggested are polymers of epihalohydrin. Canadian Pat. No. 745 682 discloses a curable thermosetting composition comprising an epoxy resin, a curing agent for the epoxy resin and a predominantly amorphous polymer of epihalohydrin having a weight average molecular weight of at least about 500.

It has now been found that improved compositions may be obtained by including in a curable epoxy resin composition a relatively small amount of a polymer of epihalohydrin and a polycarbonate. These compositions not only have an improved impact strenght but also have a higher velocity before curing which is preferable in certain circumstances. A relatively high viscosity makes possible the use of certain solid hardeners for epoxy resin which hardeners tend to settle out of lower viscosity compositions. Also, a relatively high viscosity may be preferred in the manufacture of fiber composite materials in that a relatively high pressure may be used during the curing of the fiber-reinforced composite in order to reduce the void volume without excessive flow of the matrix material, i.e. the epoxy resin composition, away from the reinforcing fibers. A further advantage of the compositions according to the present invention is that they are film forming and so they are suitable for use in the production of prepreg fiber composite materials.

Thus, according to the present invention a hardenable epoxy resin composition comprising a curable epoxy resin, a hardener for the epoxy resin and a polymer of epihalohydrin is characterised in that the amount of the polymer of epihalohydrin in the composition is from 1 to 6 parts by weight per one hundred parts by weight of the epoxy resin and in that the composition also comprises from 2 to 25 parts by weight per one hundred parts by weight of the epoxy resin of a polycarbonate having the general formula;

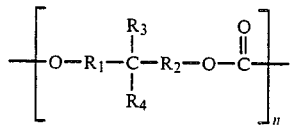

where $R_1$ and $R_2$ are the same or different and are phenyl or cyclohexyl groups, $R_3$ and $R_4$ are the same or different and are hydrogen, methyl or cyclohexyl groups and n is from 60 to 400 and represents the average number of monomer units in the polymer chain. Preferably n is from 100 to 130.

Epoxy resins, i.e. substances containing on average more than one, 1,2-epoxide group per molecule, suitable for use in the present invention are known. Although any epoxy resin may be used, the preferred epoxy resins include (a) polyglycidyl esters obtained, for example, by reaction of a compound containing at least two free carboxyl groups with epichlorohydrin or dichlorohydrin in the presence of an alkali, (b) polyglycidyl ethers obtained, for example, by a dehydrohalogenation condensation reaction between an epichlorohydrin or dichlorohydrin with a polyhydric phenol or polyol under alkaline conditions, or, alternatively, in the presence of an acidic catalyst with subsequent treatment with alkali and (c) polyglycidyl amines. Mixtures of epoxy resins may be used. Many epoxy resins are commercially available. A particularly suitable epoxy resin is sold by Ciba Geigy under the trade name CIBA MY720 (CIBA is a registered trade mark). This epoxy resin is a tetraglycidyl 4,4'diaminodiphenyl methane. Another particularly suitably commercially available epoxy resin is sold by Dow under the trade designation XD7342.02. This resin is a triglycidyl ether of tris(hydroxyphenyl)methane.

The epoxide equivalent of the epoxy resin, i.e. the equivalent weight of the composition per epoxide group, is not a critical factor in the selection of a suitable epoxy resin. However, an epoxy resin having a relatively low epoxide equivalent tends to be rather brittle when cured and an epoxy resin having a relatively high epoxide equivalent has a low reactivity. Preferably therefore the epoxide equivalent of the epoxy resin is from 100 to 290.

Any of the known hardeners for epoxy resins may be used in the present invention. One commonly used hardener for epoxy resins is diaminodiphenylsulphone. The amount of this hardener used in compositions according to the present invention is typically from 10 to 40 parts by weight per one hundred parts by weight of the epoxy resin, preferably from 20 to 35 parts.

The inclusion of both the polycarbonate and the polymer of epihalohydrin in the composition according to the present invention increases the viscosity of the composition thereby enabling solid hardeners to be used to cure epoxy resins for which they would normally be unsuitable. A particularly suitable solid hardener is dicyandiamide. The amount of this hardener used in compositions according to the present invention is typically from 2 to 15 parts, preferably 3 to 10 parts by weight per one hundred parts by weight of the epoxy resin.

Polymers of epihalohydrin are known and are homopolymers of any epihalohydrin, e.g. epichlorohydrin, epibromohydrin, epiiodohydrin or epifluorohydrin or copolymers of one or more epihalohydrin with a suitable comonomer. The preferred epihalohydrin is epichlorohydrin. Suitable comonomers include aliphatic epoxy compounds, episulphides, aziridines, thianes, oxetanes, azetidines, thietanes, oxocanes, tetrahydrofuran, tetrahydropyran, tetrahydrothiophene, 1,3-dioxolane, oxepane, 1,3-dioxepane. Preferably the comonomer is an epoxide-containing monomer. Epihalohydrin copolymers preferably comprise a major proportion of epihalohydrin and a minor proportion of the comonomer. A particularly suitable copolymer for use in the present invention is poly(epichlorohydrin-co-ethylene oxide).

If the polymer of the epihalohydrin is a homopolymer, the molecular weight is preferably from $1.8 \times 10^3$ to $1.8 \times 10^4$. If the polymer of the eiphalohydrin is a copolymer, it preferably has a molecular weight of from $6.8 \times 10^5$ to $6.8 \times 10^6$.

The amount of the polymer of epihalohydrin used in the composition will depend on such factors as the molecular weight of the polymer and the desired viscosity of the resin. The use of more than 6 parts of polymer of epihalohydrin tends to make the composition shear thickening. A shear thickening epoxy resin would be unsuitable for a number of applications including using the resin as a matrix material for fiber reinforced articles. Preferably, therefore, the composition according to the present invention comprises from 3 to 5 parts by weight of the polymer of epihalohydrin per hundred parts by weight of the epoxy resin.

Preferably, the polycarbonate has a molecular weight of from $2 \times 10^4$ to $1.3 \times 10^5$ and more preferably from 20000 to 60000. The amount of polycarbonate in the compositions is preferably from 5 to 15 parts by weight per one hundred parts by weight of the epoxy resin. Polycarbonates as hereinbefore defined are known and some are commercially available. For example, a suitable polycarbonate having the general formula;

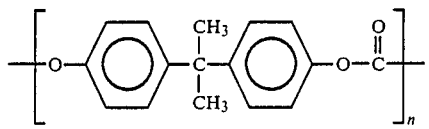

where n is about 114 (Molecular weight approximately 30000) is sold by Bayer under the trade mark Makrolon 2800.

A cure accelerator may be included in the composition, if required. A suitable accelerator for diaminodiphenylsulphone is boron trifluoride-monoethyl amine complex. Typically the amount of cure accelerator included in the composition is from 0.5 to 3 parts by weight per hundred parts by weight of the epoxy resin. Dicyandiamide does not require an accelerator.

The compositions according to the present invention may also contain other substances such as, for example, fillers, pigments, dyes, plasticisers and other resins or resin-forming materials.

The components of the composition according to the present invention may be combined by known methods. For example, the compositons may be prepared simply by mixing the epoxy resin, polymer of epihalohydrin and polycarbonate together. The hardener may be mixed together with these three components or subsequently added to a mixture of the three components. Preferably, the components are mixed together at an elevated temperature which is below the activation temperature of the hardener.

A preferred method of preparing the compositions according to the present invention comprises dissolving the components in a suitable solvent such as, for example, methylene chloride, chloroform, methyl ethyl ketone or acetone. Typically the amount of solvent used is from 100 to 300 parts per hundred parts of epoxy resin by weight, preferably 75 to 150 parts. The solvent is preferably removed before curing the composition e.g. by heating to a temperature below the activation temperature of the hardener at a pressure below atmospheric pressure.

The compositions are cured by heating to a temperature above the activation temperature of the hardener. Typically, the compositions are heated to temperatures above 100° C. e.g. 110° to 130° C. The compositions may be subsequently post-cured by heating at a higher temperature e.g. about 180° C.

The hardenable epoxy resin compositions according to the present invention are suitable for use as a matrix material for fibers such as carbon fibers, graphite fibers, aramid fibers or glass fibers. The compositions may be used to produce fiber-reinforced composite materials by any of the known methods e.g. molding. However, since the compositions have relatively good filming forming properties they may be used to prepare prepreg materials i.e. fibers, which may be undirectional woven or knitted, which are impregnated with the matrix material prior to being formed into an article and cured.

The invention includes a method of producing fiber reinforced articles which comprises impregnating a fibrous material with a hardenable epoxy resin composition, as hereinbefore described, forming the impregnated fibrous material into the required shape and heating to cure the hardenable epoxy resin composition. The curing may be carried out at a pressure above atmospheric pressure in order to reduce the void volume in the cured fiber-reinforced article. The invention includes fiber-reinforced articles produced by the method.

The invention is illustrated by reference to the following examples.

EXAMPLES 1 TO 4

Four epoxy resin compositions were prepared comprising the following components in parts by weight:

| Component | Example | | | |
|---|---|---|---|---|
| | 1 | 2 | 3 | 4 |
| Epoxy resin | 93 | 88 | 86 | 91 |
| Poly(epichlorohydrin-co-ethylene oxide) | 2 | 2 | 4 | 4 |
| Polycarbonate | 5 | 10 | 10 | 5 |

The epoxy resin was a tetraglycidyl 4,4'diaminodiphenyl methane sold by Ciba Geigy under the trade name CIBA MY 720. The epoxy resin had an epoxide equivalent of 130. The poly(epichlorohydrin-co-ethylene oxide) was supplied by Hercules Powder Company under the trade name Herclor C. The copolymer had a molecular weight of about $2.7 \times 10^6$ and the ethylene oxide content was about 35% by weight. The polycarbonate was poly(2,2 propane bis(4-phenylcarbonate)) sold by Bayer under the trade name Makrolon 2800. The polymer had a molecular weight of about 30000 and a solution viscosity of 1.293

The compositions were prepared by dissolving the three components in 134 parts by weight of methylene chloride and then heating the solution to 125° C. and degassing under reduced pressure to remove the methylene chloride solvent.

The viscosities of the epoxy resin compositions were measured at 125° C. using an ICI cone and plate viscometer. The viscosity of the epoxy resin without either the epichlorohydrin copolymer or the polycarbonate was also measured at 125° C. for comparison. The results which are given in Table 1 show that the inclusion of the polymers increases the viscosity of the epoxy resin compositions to at least three times the viscosity of the unmodified epoxy resin.

TABLE 1

| Effect of Poly(epichlorohydrin-co-ethylene oxide) and Polycarbonate on the Viscosity of an Epoxy Resin | |
|---|---|
| Composition | Viscosity at 125° C. (Poises) |
| MY 720 epoxy resin | 0.6 |
| Example 1 | 1.8 |
| Example 2 | 2.3 |

TABLE 1-continued

| Effect of Poly(epichlorohydrin-co-ethylene oxide) and Polycarbonate on the Viscosity of an Epoxy Resin | |
|---|---|
| Composition | Viscosity at 125° C. (Poises) |
| Example 3 | 2.2 |
| Example 4 | 1.9 |

The four epoxy resin compositions according to the invention and the epoxy resin containing no poly(epichlorohydrin-co-ethylene oxide) or polycarbonate were heated to 130° C. and then 30 parts by weight of the hardener, diaminodiphenylsulphone was added to and mixed with each of the compositions. The temperature was maintained in the range 130° to 135° C. for about 20 minutes until the diaminodiphenylsulphone had dissolved. The compositions were then degassed under reduced pressure and poured into stainless steel molds which had been preheated to a temperature of 140° C. The moulds were placed in an oven and heated for 2 hours at 120° C. followed by 7 hours at 180° C.

The Charpy Impact resistance (ASTM D256-81, Method B), the heat distortion temperature (ASTM D1637-61), the flexural modulus and flexural strenght (ASTM D790M-81, Method 1) and the water absorption were determined for each of the compositions. The water absorption was determined by measuring the increase in weight of a sample of the cured resin after immersion in distilled water for 49 days at 80° C.

The results given in Table 2 show that the impact resistance for the compositions according to the present invention is more than double the impact resistance of the unmodified epoxy resin. The table also shows that the other properties of the resins are not seriously affected by the presence of the polymers in the epoxy resins.

TABLE 2

| Physical Properties of Cured Epoxy Resin Compositions | | | | | |
|---|---|---|---|---|---|
| Composition | Charpy Impact Resistance (KJ/m$^2$) | Heat Distortion Temperature (°C.) | Flexural Strength MPa | Flexural Modulus GPa | Water Absorption (% wt increase) |
| MY 720 Epoxy Resin | 3.9 | 206 | 63.5 | 5.55 | 5.5 |
| Example 1 | 11.7 | 210 | 73.7 | 3.40 | 4.8 |
| Example 2 | 9.7 | 202 | 63.7 | 3.34 | 4.7 |
| Example 3 | 11.3 | 204 | 66.2 | 3.20 | 4.6 |
| Example 4 | 12.8 | 196 | 56.2 | 3.23 | 5.2 |

EXAMPLES 5 TO 8

Four hardenable epoxy resin compositions were prepared comprising the following components in parts by weight:

| | Example | | | |
|---|---|---|---|---|
| Component | 5 | 6 | 7 | 8 |
| Epoxy resin | | | | |
| A | 70 | 70 | 70 | — |
| B | — | — | — | 80 |
| C | 15 | 20 | 10 | 10 |
| D | 15 | 10 | 20 | 10 |
| Poly(epichlorohydrin-co-ethylene oxide) | 4 | 4 | 4 | 4 |
| Polycarbonate | 10 | 10 | 10 | 10 |
| Hardener | 10 | 10 | 10 | 10 |

Epoxy resin A was a polyglycidyl ether with an epoxide equivalent of 180 supplied by Shell under the trade designation SHELL 114. Epoxy resin B was a triglycidyl ether of tris(hydroxy phenyl)methane with an epoxide equivalent of 162 supplied by Dow under the trade designation XD 7342.02. Epoxy resins C and D were low molecular weight epoxy resins which were included in the compositions as tackifiers. Epoxy resin C was a polyglycidyl ether of 2,2'bis(4-hydroxyphenyl)-propane supplied by Shell under the trade name EPIKOTE 828 (EPIKOTE is a trade mark) and epoxy resin D was a triglycidyl ether of para amino phenol having an epoxide equivalent of 110 supplied by Ciba Geigy under the trade designation CIBA 0500. The poly(epichlorohydrin-co-ethylene oxide) was the same as that used in Examples 1 to 4. The polycarbonate was poly(2,2 propane bis(4-phenylcabonate)) supplied by Bayer under the trade name MAKROLON 3200. The polycarbonate had a solution viscosity of 1.335. The hardener was dicyandiamide.

Samples of each of the four compositions were cured and the Charpy impact resistance, the flexural strength and modulus and the water absorption were determined for each of the compositions. The results are given in Table 3

TABLE 3

| Physical Properties of Cured Epoxy Resin Compositions | | | | |
|---|---|---|---|---|
| Composition | Charpy Impact Resistance (KJ/m$^2$) | Flexural Strength (MPa) | Flexural Modulus (GPa) | Water Absorption % wt increase |
| Example 5 | 5.62 | 97.0 | 2.93 | 1.99 |
| Example 6 | 4.36 | 86.9 | 2.88 | 2.03 |
| Example 7 | 4.90 | 85.4 | 2.88 | 2.13 |
| Example 8 | 8.84 | 84.3 | 2.94 | 2.22 |

Release paper was coated with each of the epoxy resin compositions using a commercial hot melt film forming mill. All four of the compositions had good film forming and release properties. Carbon fiber composite materials were prepared using the release paper coated with the uncured hardenable compositions of Examples 5 and 6. The coated release paper was used to impregnate unidirectional carbon fibers on a commercial impregnation machine. The impregnated fibers were cured to form fiber reinforced composite panels. The flexural strength and modulus, the flexural failure strain and the interlaminer shear stress for these composite panels are given in Table 4.

TABLE 4

| Physical Properties of Fiber Reinforced Composite Panels | | |
|---|---|---|
| | Panels formed using composition of:- | |
| | Example 5 | Example 6 |
| Flexural Strength (GPa) | 2.02 | 2.05 |
| Flexural Modulus (GPa) | 120.9 | 123.8 |
| Flexural Failure Strain (%) | 0.165 | 0.167 |

TABLE 4-continued

| Physical Properties of Fiber Reinforced Composite Panels | | |
|---|---|---|
| | Panels formed using composition of:- | |
| | Example 5 | Example 6 |
| Interlaminar Shear Stress (MPa) | 97.6 | 94.6 |

I claim:

1. A hardened epoxy resin composition comprising a curable epoxy resin, a hardener for the epoxy resin and a polymer of epihalohydrin characterised in that the amount of the polymer of epihalohydrin in the composition is from 1 to 6 parts by weight per one hundred parts by weight of the epoxy resin and in that the composition also comprises from 2 to 25 parts by weight per hundred parts by weight of the epoxy resin, of a polycarbonate having the general formula;

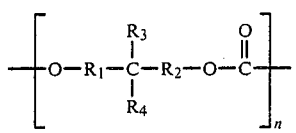

where
R$_1$ and R$_2$ are the same or different and are phenyl or cyclohexyl groups,
R$_3$ and R$_4$ are the same or different and are hydrogen, methyl or cyclohexyl groups and
n is from 60 to 400 and represents the average number of monomer units in the polymer chain.

2. A composition as claimed in claim 1 in which the polymer of epihalohydrin is a homopolymer having a molecular weight of from $1.8 \times 10^3$ to $1.8 \times 10^4$ or a copolymer having a molecular weight of from $6.8 \times 10^5$ to $6.8 \times 10^6$.

3. A composition as claimed in claim 1 in which the polymer of epihalohydrin is a homopolymer or a copolymer of epichlorohydrin.

4. A composition as claimed in claim 1 in which the polymer of epihalohydrin is poly(epichlorohydrin-co-ethylene oxide).

5. A composition as claimed in claim 1 in which the amount of the polymer of epihalohydrin in the composition is from 3 to 5 parts by weight per hundred parts by weight of the epoxy resin.

6. A composition as claimed claim 1 in which the polycarbonate has a molecular weight of from 20000 to 130000.

7. A composition as claimed in claim 1 in which the amount of polycarbonate in the composition is from 5 to 15 parts by weight per hundred parts by weight of the epoxy resin.

8. A composition as claimed in claim 1 in which the polycarbonate has the general formula;

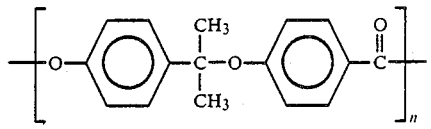

where n is from 100 to 130.

9. A composition as claimed in claim 1 in which the epoxy resin is a tetraglycidyl ether of 4,4'diaminodiphenyl methane or a trigylcidyl ether of tris(hydroxy phenyl)methane.

10. A composition as claimed in claim 1 in which the hardener for the epoxy resin is diaminodiphenylsulphone or dicyandiamide.

11. A composition as claimed in claim 1 comprising
(A) 100 parts by weight of an epoxy resin which is a tetraglycidyl ether of 4,4'diaminodiphenyl methane or a triglycidyl ether of tris(hydroxy phenyl)methane
(B) 1 to 6 parts by weight of a poly(epichlorohydrin-co-ethylene oxide)
(C) 2 to 25 parts by weight of a polycarbonate having the general formula;

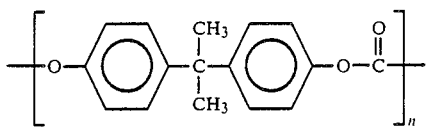

where n is from 100 to 130 and
(D) a hardener for the epoxy resin.

12. A method of producing fiber reinforced artices comprising impregnating a fibrous material with a hardenable epoxy resin composition as claimed in claim 1, forming the impregnated fibrous material into the required shape and heating to cure the hardenable epoxy resin composition.

13. A fiber reinforced article produced according to the method of claim 12.

* * * * *